US011957940B2

(12) United States Patent
Perry

(10) Patent No.: US 11,957,940 B2
(45) Date of Patent: Apr. 16, 2024

(54) BREATHING SYSTEMS AND METHODS FOR MAKING AND USING SUCH SYSTEMS

(71) Applicant: TURN2 SPECIALTY COMPANIES, LLC, Baytown, TX (US)

(72) Inventor: Travis Perry, Baytown, TX (US)

(73) Assignee: TURN2 SPECIALTY COMPANIES, LLC, Baytown, TX (US)

( * ) Notice: Subject to any disclaimer, the term of this patent is extended or adjusted under 35 U.S.C. 154(b) by 0 days.

(21) Appl. No.: 17/947,876

(22) Filed: Sep. 19, 2022

(65) Prior Publication Data

US 2023/0092326 A1 Mar. 23, 2023

Related U.S. Application Data

(60) Provisional application No. 63/246,422, filed on Sep. 21, 2021.

(51) Int. Cl.
*A62B 9/02* (2006.01)
*A62B 7/02* (2006.01)
*A62B 18/04* (2006.01)

(52) U.S. Cl.
CPC .................. *A62B 9/02* (2013.01); *A62B 7/02* (2013.01); *A62B 18/04* (2013.01)

(58) Field of Classification Search
CPC .... A62B 7/00; A62B 7/02; A62B 9/00; A62B 9/02; A62B 9/022; A62B 9/025; A62B 9/027; A62B 18/00; A62B 18/02; A62B 18/025; A62B 18/04; A62B 18/10
See application file for complete search history.

(56) References Cited

U.S. PATENT DOCUMENTS 4,449,524 A * 5/1984 Gray ......................... A62B 9/00 128/205.24
4,714,077 A 12/1987 Lambert
5,199,423 A 4/1993 Harral et al.
5,738,088 A * 4/1998 Townsend .............. B63C 11/18 128/205.24
6,070,577 A 6/2000 Troup
(Continued)

OTHER PUBLICATIONS

International Search Report and Written Opinion issued to PCT/US2022/043980, dated Jan. 17, 2023, 13 pages.
(Continued)

*Primary Examiner* — Colin W Stuart
(74) *Attorney, Agent, or Firm* — K&L Gates LLP

(57) ABSTRACT

In some embodiments, the present disclosure provides a method to process high pressure air into low pressure breathing air for one or more sealing and locking helmets and/or one or more air respirators. Other embodiments include a system configured to perform such a method and a manufacturing process of making such a system. In some embodiments, the breathing system automatically fills a local reserve bottle by pressure equalization. In this regard, the secondary supply bottles will fill the backup bottle when the console module operator (CMO) connects the secondary air supply to the system. The backup bottle will then be isolated from depletion during normal operation by means of a check valve to prevent back flow of the emergency cylinder into the secondary air supply. The local reserve bottle will protect against loss of air on any of the high pressure air hoses.

14 Claims, 3 Drawing Sheets

(56) References Cited

U.S. PATENT DOCUMENTS

| | | | | |
|---|---|---|---|---|
| 9,105,171 | B2 | 8/2015 | Flood et al. | |
| 10,583,316 | B1 | 3/2020 | Cantu et al. | |
| 2015/0068518 | A1 | 3/2015 | Roberts | |
| 2015/0273247 | A1 | 10/2015 | Reinmann, Jr. et al. | |
| 2022/0126123 | A1* | 4/2022 | Lee | A62B 7/02 |

OTHER PUBLICATIONS

BSF User Instructions, UI1 (User Manual), www.breathingsystemsinc.com, Feb. 1, 2018.
Airtrack, Luno Systems literature, Jan. 11, 2018, www.lunosystems.com.
Airmaster 4, Luno Systems literature, Apr. 17, 2018, www.lunosystems.com.
Edelhoff Life Support System 2020, technical information, Mar. 2021, Edition 1, www.edelhoff-technologies.com.
Written Opinion of the International Searching Authority issued to related PCT/US2022/043980, dated Jan. 17, 2023, 6 pages.

* cited by examiner

BREATHING SYSTEMS AND METHODS FOR MAKING AND USING SUCH SYSTEMS

CROSS-REFERENCE TO PRIOR FILED APPLICATIONS

This application incorporates by reference and claims the benefit of priority to U.S. Provisional Application No. 63/246,422 filed on Sep. 21, 2021.

BACKGROUND

Increasing use of hazardous chemicals to make various plastics, pesticides, and numerous other household and industrial products has led to increased risk of contamination of large areas for extended periods due to accidents during transport or manufacturing processes using such chemicals. Industrial environments also require continuous protection for workers in some areas due to risks of exposure to chemicals, inert atmospheres, or biological agents in their day-to-day work environment.

Such workers are typically equipped with protective suits and protected or self-contained breathing air supplies. Protected breathing air is generally provided by either a compressed gas cylinder containing a breathable air mixture, or by powered or unpowered air filter units.

SUMMARY

In some embodiments, the present disclosure provides a method to process high pressure air into low pressure breathing air for one or more sealing and locking helmets and/or one or more air respirator. Other embodiments include a system configured to perform such a method and a manufacturing process of making such a system.

In some embodiments, the breathing system automatically fills the local reserve bottle by pressure equalization. In this regard, the secondary supply bottles will fill the backup bottle when the console module operator (CMO) connects the secondary air supply to the system. The backup bottle will then be isolated from depletion during normal operation by means of a check valve to prevent back flow of the emergency cylinder into the secondary air supply. The local reserve bottle will protect against loss of air on any of the high pressure air hoses.

Accordingly, an advantage of one or more embodiments provided by the present disclosure is a fail-safe breathing system that has a single valve control mechanism.

Another advantage of one or more embodiments provided by the present disclosure is a fail-safe breathing system that makes it impossible or almost impossible to interrupt air to a user.

Yet another advantage of one or more embodiments provided by the present disclosure is a fail-safe breathing system that does not rely completely on a control system.

Additional features and advantages are described herein and will be apparent from the following Detailed Description and the Figures.

DETAILED DESCRIPTION

Figure 1:
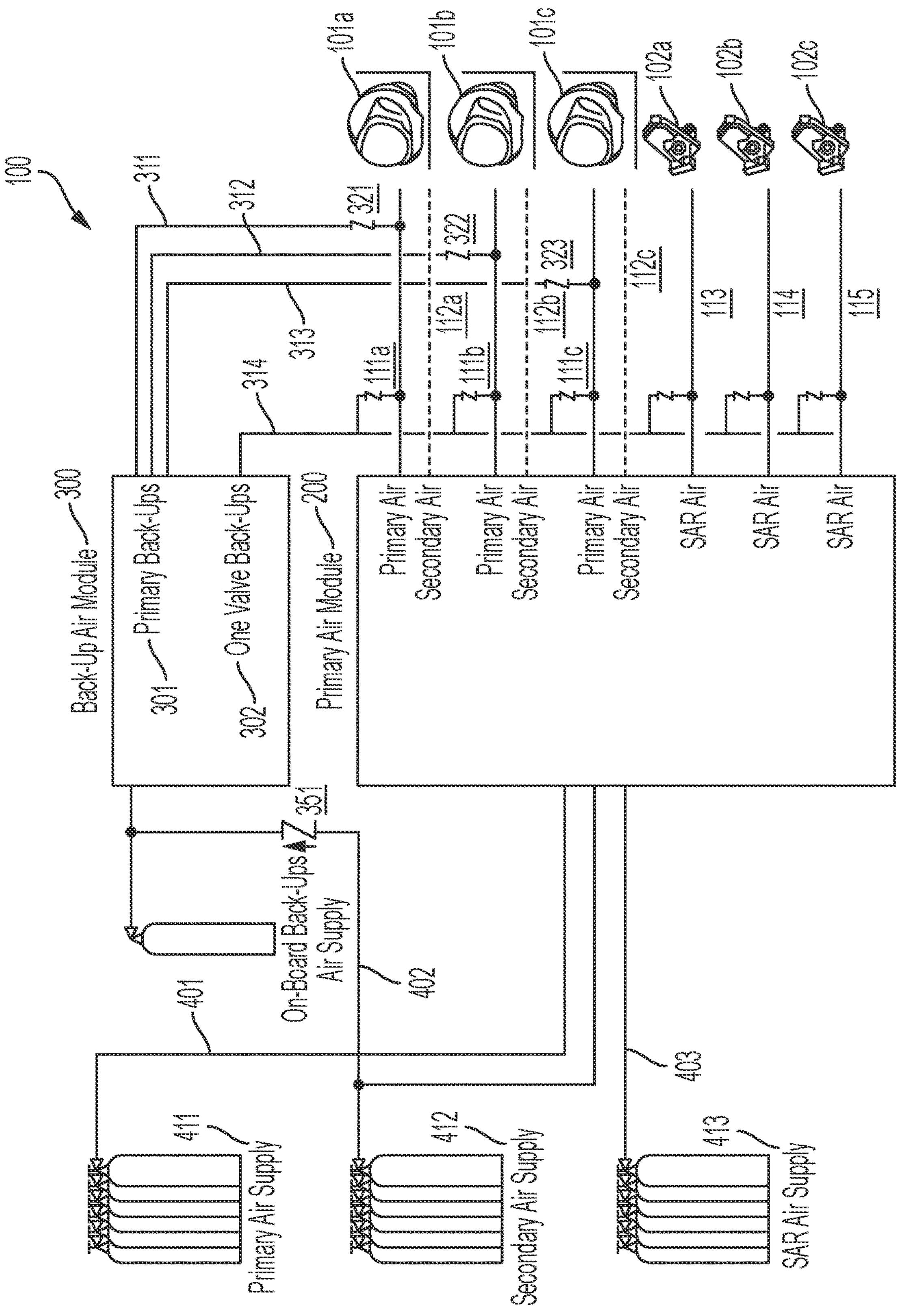
FIG. 1 is an overview schematic diagram of an embodiment of a system disclosed herein.

As used in this disclosure and the appended claims, the singular forms "a," "an" and "the" include plural referents unless the context clearly dictates otherwise. Thus, for example, reference to "a compound" or "the compound" includes a single compound and also two or more compounds.

The words "comprise," "comprises" and "comprising" are to be interpreted inclusively rather than exclusively. Likewise, the terms "include," "including" and "or" should all be construed to be inclusive, unless such a construction is clearly prohibited from the context. However, the compositions disclosed herein may lack any element that is not specifically disclosed. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. Any embodiment disclosed herein can be combined with any other embodiment disclosed herein.

The terms "at least one of" and "and/or" used respectively in the context of "at least one of X or Y" and "X and/or Y" should be interpreted as "X without Y," or "Y without X," or "both X and Y." Where used herein, the terms "example" and "such as," particularly when followed by a listing of terms, are merely exemplary and illustrative and should not be deemed to be exclusive or comprehensive.

As used herein, "about" is understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number.

"High pressure" air in the present disclosure is at least about 500 psi. "Low pressure" is no greater than about 120 psi.

The methods and compositions and other advances disclosed herein are not limited to particular methodologies, protocols, and reagents because, as the skilled artisan will appreciate, they may vary. Further, the terminology used herein is for the purpose of describing particular embodiments only and does not limit the scope of that which is disclosed or claimed.

Unless defined otherwise, all technical and scientific terms, terms of art, and acronyms used herein have the meanings commonly understood by one of ordinary skill in the art in the field(s) of the present disclosure or in the field(s) where the term is used. Although any compositions, methods, articles of manufacture, or other means or materials similar or equivalent to those described herein can be used, the preferred devices, methods, articles of manufacture, or other means or materials are described herein.

Preferred embodiments provided by the present disclosure are described hereafter.

FIG. 1 shows a schematic diagram of an embodiment of a breathing system 100 according to the present disclosure. The breathing system 100 comprises a primary air module 200 and a back-up air module 300. The primary air module 200 is preferably an electronic system as failures with manually operated systems are usually less likely. The back-up air module 300 can be used with manually operated air modules as failures may be rare but are still possible. In a preferred embodiment, the back-up air module 300 comprises a primary back-up circuit 301 and further comprises a one valve back-up circuit 302, which can advantageously provide near thought-free operation in the event of air loss.

Typically, life support operations of the breathing system 100 can be controlled from a trailer or enclosed box, also known as a cube. The primary air module 200 and/or the back-up air module 300 can be installed in one of these enclosures and operated by a console module operator (CMO) who is responsible for operating the primary air module and/or the back-up air module. For the remainder of this document, "cube" will be used for simplicity, but the primary air module 200 and/or the back-up air module 300 can be installed in a cube, a trailer, or any other enclosure.

In a preferred embodiment, air is supplied to the cube by at least two high pressure air hoses, in some embodiments by at least three high pressure air hoses 401,402,403. The high pressure air hoses 401,402,403 can be attached to the cube, for example by corresponding fittings on the exterior of the cube which are configured for attachment of a compressed gas cylinder (e.g., CGA fittings). Each of the high pressure air hoses 401,402,403 are attached to a high pressure air source, for example a primary air supply 411, a secondary air supply 412, and a supplied-air respirator (SAR) air supply 413. Typically, each of the high pressure air sources comprises one or more high pressure breathing air cylinders.

The primary air supply 411 can provide high pressure air (i.e., at least about 500 psi) to the primary air module 200. Furthermore, the secondary air supply 412 can provide high pressure air to the primary air module 20 substantially simultaneously with the high pressure air from the primary air supply 411.

The length of the high pressure air hoses 401,402,403 and the location of the cylinders of the air sources 411,412,413 can vary based on the availability of space around the cube. Because this distance can be over one hundred feet, a risk of severing the hoses or unauthorized closure of the bottles exists. Accordingly, in preferred embodiments of the system 100, this risk is mitigated by using a local reserve bottle 350 ("On-Board Back-Up Air Supply"). The figure shows one local reserve bottle 350, but any number of such bottles are possible, and the present disclosure is not limited to a specific number of the local reserve bottle 350. Preferably, the local reserve bottle 350 has a smaller capacity than the air sources 411,412,413.

The breathing system 100 automatically fills the local reserve bottle 350, and preferably this operation is done automatically via pressure equalization. The secondary supply bottles 412 will fill the backup bottle when the CMO connects the secondary air supply to the system. The backup bottle will then be isolated from depletion during normal operation by means of a check valve 351 to prevent back flow of the emergency cylinder into the secondary air supply. The local reserve bottle 350 will protect against loss of air on any of the high pressure air hoses 401,402,403.

The back-up air module 300 can comprise a plurality of outlets, for example at least three outlets 311,312,313 (and in some embodiments, for example with six or more helmets, at least six outlets) which connect downstream of the primary air module 200 to prevent the primary air module 200 from interfering with the operation of the back-up air module 300. The breathing system 100 can comprise a plurality of check valves, for example a first check valve 321, a second check valve 322, and a third check valve 323, to prevent undesired operation of the primary air module 200 in the form of pneumatic channel crosstalk.

The breathing system 100 is preferably configured to simultaneously provide low pressure breathing air from the high pressure air sources, for example the primary air supply 411, the secondary air supply 412, and the supplied-air respirator (SAR) air supply 413, to one or more sealing and locking helmets 101*a*, 101*b* and 101*c* and/or one or more air respirators 102*a*, 102*b* and 102*c*. For example, the primary air module 200 can be fluidly and/or electronically connected to each of the one or more sealing and locking helmets 101*a*, 101*b*, 101*c* and/or each of the air respirators 102*a*, 102*b* and 102*c*.

In some embodiments, each of the one or more sealing and locking helmets 101*a*, 101*b* and 101*c* has low pressure primary air supply hoses 111*a*, 111*b* and 111*c* and low pressure secondary air supply hoses 112*a*, 112*b* and 112*c* respectively. The primary and secondary low pressure air supplies are preferably provided simultaneously to each of the one or more sealing and locking helmets 101*a*, 101*b* and 101*c*.

The primary air module 200 is configured to reduce the high pressure primary and high pressure secondary air supplies simultaneously, or variably, depending on individual user need and produce a plurality of low pressure air supplies, e.g., about 120 psi, all simultaneously with pairs of low pressure air supplies going to each of the one or more sealing and locking helmets 101*a*, 101*b* and 101*c*. For example, the breathing system 100 can comprise a processor controlling the primary air module 200 accordingly. In some embodiments, the primary air module 200 receives high pressure air from the primary air supply 411 and then lowers the pressure to a breathing air pressure while simultaneously controlling air velocity and pressure, and then providing a plurality of streams of low pressure breathing air to each of the one or more sealing and locking helmets 101*a*, 101*b* and 101*c*.

As known in the art, the primary air module 200 can comprise a pressure sensor, a temperature sensor, and an output to turn valves therein on and off. The primary air module 200 can collect the signals and information from the pressure and temperature sensors based on the program that is installed within the data storage connected to the processor of the air processor.

In some embodiments, the breathing system 100 can provide low pressure breathing air to the one or more air respirators 102*a*, 102*b* and 102*c*, for example by SAR supply hoses 113,114,115 from the primary air module 200.

Figure 2:
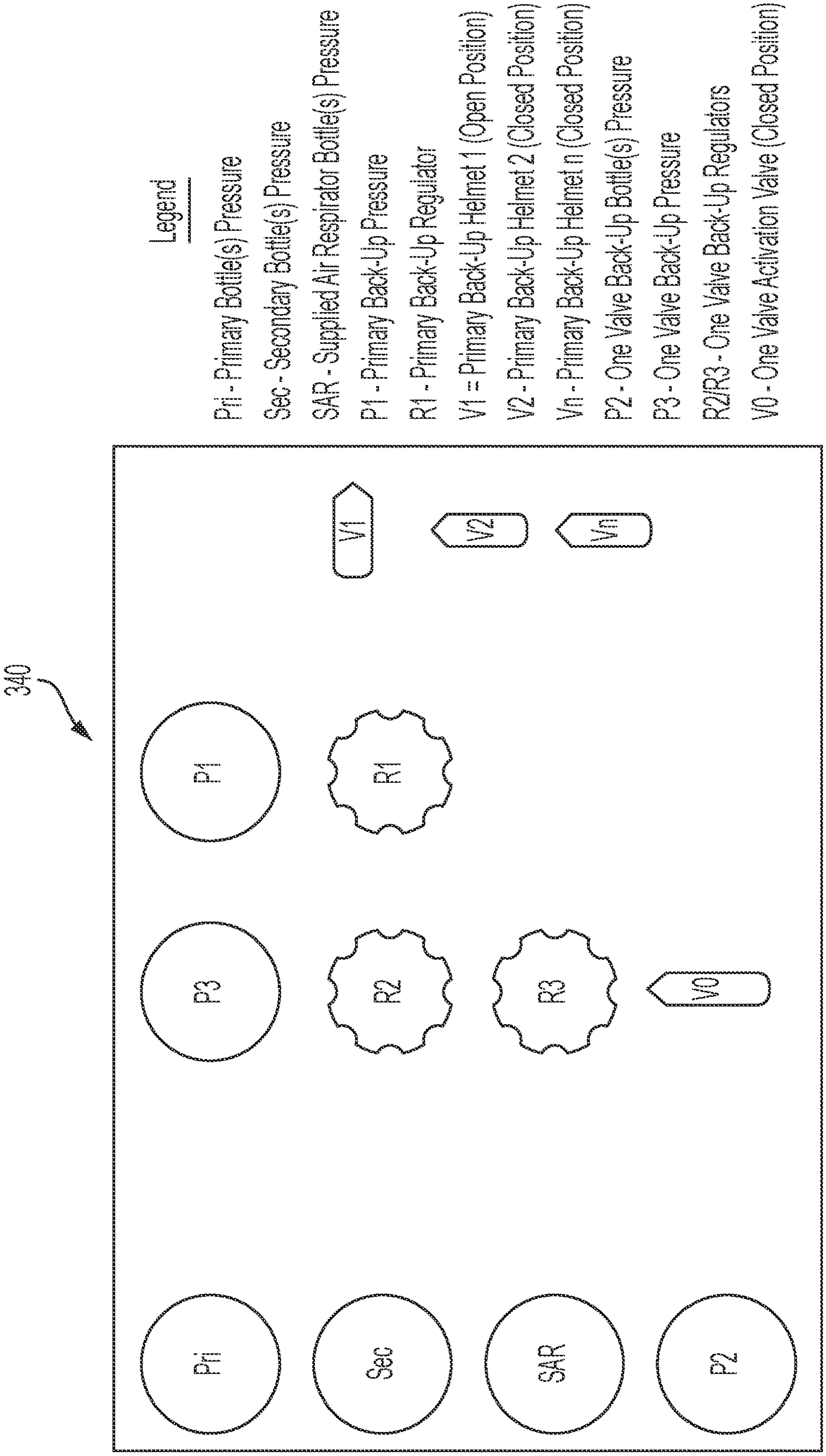
FIG. 2 is a schematic diagram of an embodiment of an operator panel used in a system disclosed herein.

FIG. 2 shows a non-limiting embodiment of an operator panel 340 comprising valves and gauges that facilitate operation of the back-up air module 300 possible in the event of a single failure of the primary air module 200 or catastrophic failure. The breathing system 100 thereby provides a means to keep air flowing in the event of a total power failure and/or loss of external air supply. The gauges provide information to the operator in the event of control system failure.

The gauges on the left can provide the operator with information about the status of the four supplies of air, e.g., the primary air supply 411, the secondary air supply 412, the SAR air supply 413, and the local reserve bottle 350. Examples of such gauges follow hereafter:

Pri—The current pressure of the one or more cylinders of the primary air supply 411 (preferably external to the cube)

Sec—The current pressure of the one or more cylinders of the secondary air supply 412 (preferably external to the cube)

SAR—The current pressure of the one or more cylinders of the SAR air supply 413 (preferably external to the cube)

P2—The current pressure of the local reserve bottle 350 (preferably located inside the cube)

The gauges at the top center of the operator panel can provide back-up pressure. Examples of such gauges follow hereafter:

P3—Pressure of the one valve back-up circuit 302

P1—Pressure of the primary back-up circuit 301

The valves perform the following functions.

V0—This valve activates the one valve back-up circuit 302 and preferably is a manual valve (shown in the closed position).

V1—This valve operates a first one of the primary back-up circuit 301 and preferably is a manual valve (shown in the open position).

V2/Vn—These valves operate a second one and any further primary back-up circuits 301 (valves shown in the closed position).

V3/V4/Vn—shutoff device bypass valve (not shown) for the primary air module 200. This valve configuration is used to bypass an electronic device or other device in the primary air module 200 that can stop the flow of air to the user. This device in the primary air module 200 preferably comprises a solenoid operated valve but could optionally be a flow controller or other flow-limiting device. The location of this valve can be remotely installed away from the operator panel if redundant to the one valve back-up circuit 302.

Figure 3:
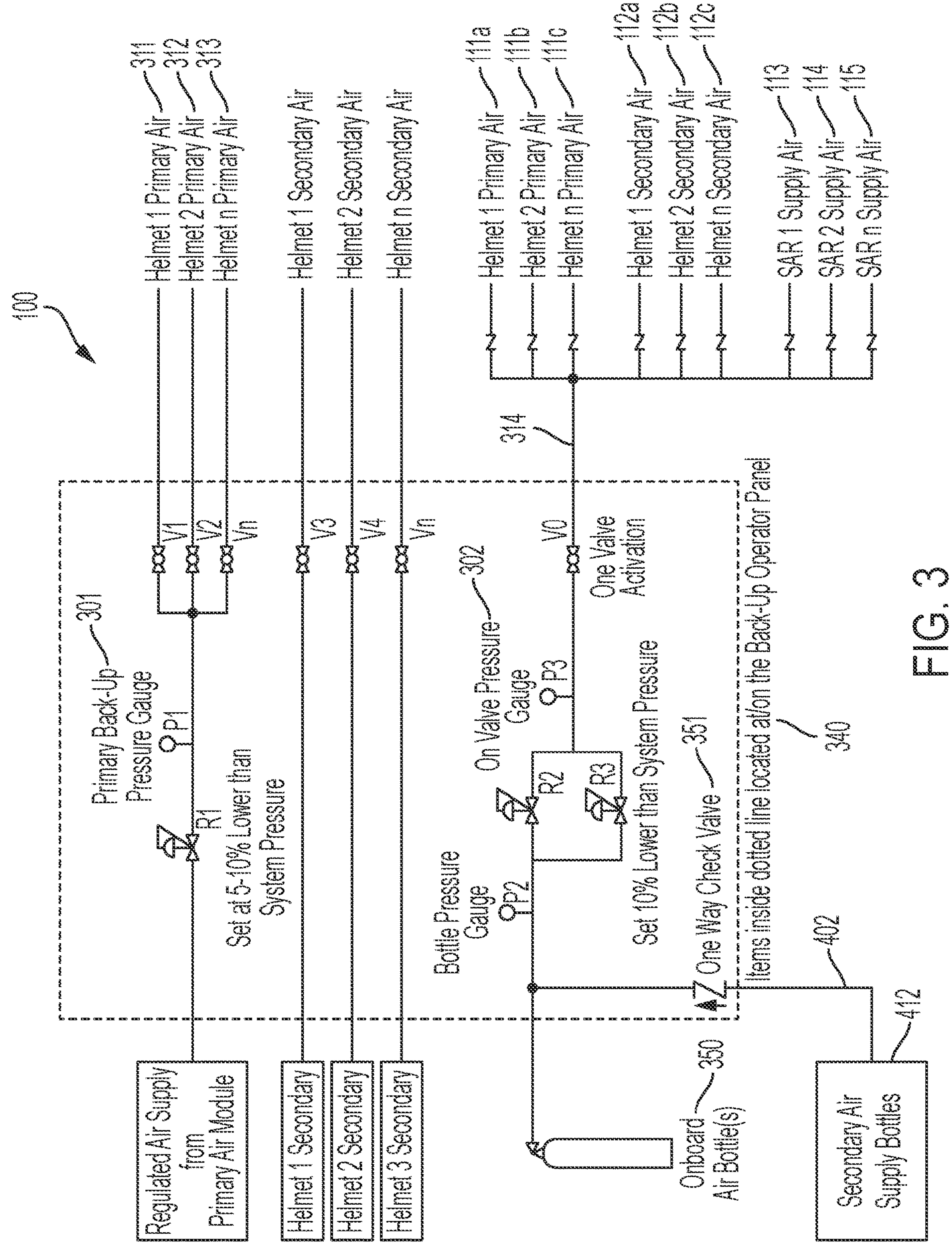
FIG. 3 is a schematic diagram of a flowpath in an embodiment of a primary air module used in a system disclosed herein.

FIG. 3 shows a simplified flow path of the back-up air module 300. The box with the dotted line represents the operator panel 340 of the back-up air module 300. The operator panel 340 preferably is positioned located near the console module operator (CMO) for ease of operation. The operator panel 340 contains high pressure inlet gauges that read bottle pressure from the primary air supply 411, the secondary air supply 412, the SAR air supply 413 and the local reserve bottle 350. The operator panel 340 preferably also contains at least two additional gauges, for example a first additional gauge for the pressure of the primary back-up circuit 301 and/or a second additional gauge for the pressure of the one valve back-up circuit 302. The back-up module 300 preferably operates at a lower pressure for two reasons; the first is to ensure the breathing system 100 shows a low-pressure alarm while the back-up air module 300 is being used, and the second is to ensure the back-up air module 300 is not providing air where air is not needed because the primary air module 200 is functioning.

In the figure, the top circuit is the primary back-up circuit 301. The air is shown on the left side as coming from the regulated air supply on the primary air module 200. This supply is typically about 120 psig. The air then enters into regulator R1, which decreases the pressure 5-10% of the system value. This decrease is meant to prevent the primary back-up circuit 301 from bypassing the normal flow path in the event that the valve is left open or inadvertently operated. From the regulator R1, the air is divided into a plurality of valves, which when opened, send air to the primary circuit of the helmets bypassing the primary air module 200.

The middle three circuits of the back-up air module 300 (as shown in the figure) are bypass valves around the secondary circuits in the primary air module 200. The supply box on the left represents a source of air upstream of the shutoff valve in the primary air module 200. The right side returns to the either downstream of the shutoff valve of the primary air module 200 or connects in the same place as the other connections, after the primary air module 200. This valve can be located at the operator panel 340 or another remote but easily accessed area.

The bottom circuit of the back-up air module 300 (as shown in the figure) is the one valve back-up circuit 302. The one valve back-up circuit 302 can receive air supply from two sources, namely, the secondary air supply 412 if available, and in the event the secondary air supply 412 is not available, the one valve back-up circuit 302 can draw air from the local reserve bottle 350. The local reserve bottle 350 automatically fills when the secondary air supply 412 is attached and opened for service. As the secondary air supply 412 is spent, the one-way check valve 351 maintains the filled pressure of the local reserve bottle 350 automatically. The local reserve bottle 350 can be monitored at the operator panel 340 and electronically.

From the air source, the air is preferably routed into two parallel high pressure regulators R2 and R3. Two parallel high pressure regulators R2 and R3 can be used for redundancy, for example, both regulators R2 and R3 set to a pressure of at least 10% lower than the system operating pressure. This setting prevents the local reserve bottle 350 from being depleted by using air when the local reserve bottle 350 is not needed (e.g., the individual channels are functioning properly). From the regulators R2 and R3, the air is routed through a single high flow ball valve V0, which is preferably the only valve in the back-up circuit 302. The air passes through the single high flow ball valve V0 and proceeds to several manifolds designed to supply air where the pressure/flow is too low. The one valve back-up circuit 302 is designed to assist the CMO in the event that an emergency occurs, and the CMO is not able to assess the problem immediately. The emergency can be in the form of air supply to the cube or an internal fault within the primary air module 200.

In view of the preceding disclosures, an aspect of the present disclosure is a method comprising:

directing a first amount of high pressure air from a primary air supply to a primary air module;

directing a second amount of the high pressure air from a secondary air supply to the primary air module, substantially simultaneously with the first amount of the high pressure air from the primary air supply;

lowering the pressure of the first and second amounts of the high pressure air in the primary air module to thereby form a first amount of the low pressure breathing air in the primary air module;

directing the first amount of the low pressure breathing air from the primary air module to the one or more sealing and locking helmets and/or one or more air respirators;

directing a third amount of the high pressure air from the secondary air supply to a one valve back-up circuit in a back-up air module, wherein the third amount of the high pressure air bypasses the primary air module, and the back-up air module is configured to lower the pressure of the third amount of the high pressure air to thereby form a second amount of the low pressure breathing air; and directing a fourth amount of the high pressure air from a reserve bottle, which is isolated from depletion by a one-way check valve, to the one valve back-up circuit in the back-up air module upon unavailability of the secondary air supply for the one valve back-up, and the back-up air module is configured to lower the pressure of the fourth amount of the high pressure air to thereby form a third amount of the low pressure breathing air.

In some embodiments, the primary and secondary air supplies are external to a cube in which the reserve bottle is located, and the method comprises automatically filling the reserve bottle by pressure equalization when the secondary air supply connects to the cube.

In some embodiments, the method comprises using the one-way check valve to automatically maintain the filled pressure of the reserve bottle as the secondary air supply is spent.

In some embodiments, the back-up module further comprises a primary back-up circuit in addition to the one valve back-up circuit, and optionally the back-up module further comprises a secondary back-up circuit in addition to the one valve back-up circuit and the primary back-up circuit.

In some embodiments, the one valve back-up circuit comprises a single high flow ball valve.

In some embodiments, the one valve back-up circuit comprises at least two parallel high pressure regulators, and both of the regulators are set to a pressure of at least about 10% lower than a system operating pressure.

In some embodiments, the method further comprises directing a fifth amount of the high pressure air from a third air supply to the primary air module and then to one or more air respirators.

Another aspect of the present disclosure is a manufacturing process to make a system configured to perform any method disclosed herein, the manufacturing process comprising fluidly connecting the reserve bottle to the one valve back-up circuit in the back-up air module.

Yet another aspect of the present disclosure is a means for performing any method disclosed herein.

A further aspect of the present disclosure is a system to process high pressure air into low pressure breathing air for one or more sealing and locking helmets and/or one or more air respirators, the system comprising:

a primary air supply configured to supply a first amount of the high pressure air to a primary air module;

a secondary air configured to supply a second amount of the high pressure air to the primary air module, substantially simultaneously with the first amount of the high pressure air from the primary air supply, wherein the primary air module is configured to lower the pressure of the first and second amounts of the high pressure air in the primary air module to thereby form a first amount of the low pressure breathing air in the primary air module, and the primary air module is configured to supply the first amount of the low pressure breathing air from the primary air module to the one or more sealing and locking helmets and/or one or more air respirators;

a one valve back-up circuit in a back-up air module, the one valve back-up circuit configured to receive a third amount of the high pressure air from the secondary air supply, wherein the third amount of the high pressure air bypasses the primary air module, and the back-up air module is configured to lower the pressure of the third amount of the high pressure air to thereby form a second amount of the low pressure breathing air; and a reserve bottle isolated from depletion by a one-way check valve and configured to supply a fourth amount of the high pressure air to the one valve back-up circuit in the back-up air module upon unavailability of the secondary air supply for the one valve back-up, and the back-up air module is configured to lower the pressure of the fourth amount of the high pressure air to thereby form a third amount of the low pressure breathing air.

In some embodiments, the primary and secondary air supplies are external to a cube in which the reserve bottle is located, and the system is configured to automatically fill the reserve bottle by pressure equalization when the secondary air supply connects to the cube.

In some embodiments, the one-way check valve is configured to automatically maintain the filled pressure of the reserve bottle as the secondary air supply is spent.

In some embodiments, the back-up module further comprises a primary back-up circuit in addition to the one valve back-up circuit, and optionally the back-up module further comprises a secondary back-up circuit in addition to the one valve back-up circuit and the primary back-up circuit.

In some embodiments, the one valve back-up circuit comprises a single high flow ball valve.

In some embodiments, the one valve back-up circuit comprises at least two parallel high pressure regulators, and both of the regulators are set to a pressure of at least about 10% lower than a system operating pressure.

In some embodiments, the system further comprises a third air supply configured to provide a fifth amount of the high pressure air from to the primary air module and then to one or more air respirators.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method to process high pressure air into low pressure breathing air for one or more sealing and locking helmets and/or one or more air respirators, the method comprising:

directing a first amount of the high pressure air from a primary air supply to a primary air module;

directing a second amount of the high pressure air from a secondary air supply to the primary air module, simultaneously with the first amount of the high pressure air from the primary air supply;

lowering the pressure of the first and second amounts of the high pressure air in the primary air module to thereby form a first amount of the low pressure breathing air in the primary air module;

directing the first amount of the low pressure breathing air from the primary air module to the one or more sealing and locking helmets and/or one or more air respirators;

directing a third amount of the high pressure air from the secondary air supply to a one valve back-up circuit in a back-up air module, wherein the third amount of the high pressure air bypasses the primary air module, and the back-up air module is configured to lower the pressure of the third amount of the high pressure air to thereby form a second amount of the low pressure breathing air; and directing a fourth amount of the high pressure air from a reserve bottle, which is isolated from depletion by a one-way check valve, to the one valve back-up circuit in the back-up air module upon unavailability of the secondary air supply for the one valve back-up circuit, and the back-up air module is configured to lower the pressure of the fourth amount of the high pressure air to thereby form a third amount of the low pressure breathing air.

2. The method of claim 1, wherein the primary and secondary air supplies are external to a cube in which the reserve bottle is located, and the method comprises automatically filling the reserve bottle by pressure equalization when the secondary air supply connects to the cube.

3. The method of claim 2, comprising using the one-way check valve to automatically maintain the filled pressure of the reserve bottle as the secondary air supply is spent.

4. The method of claim 1, wherein the back-up module further comprises a primary back-up circuit in addition to the one valve back-up circuit, and optionally the back-up module further comprises a secondary back-up circuit in addition to the one valve back-up circuit and the primary back-up circuit.

5. The method of claim 1, wherein the one valve back-up circuit comprises a single high flow ball valve.

6. The method of claim 1, wherein the one valve back-up circuit comprises at least two parallel high pressure regulators, and both of the at least two regulators are set to a pressure of at least about 10% lower than a system operating pressure.

7. The method of claim 1, further comprising directing a fifth amount of the high pressure air from a third air supply to the primary air module and then to one or more air respirators.

8. A system to process high pressure air into low pressure breathing air for one or more sealing and locking helmets and/or one or more air respirators, the system comprising:

a primary air supply configured to supply a first amount of the high pressure air to a primary air module;

a secondary air supply configured to supply a second amount of the high pressure air to the primary air module, simultaneously with the first amount of the high pressure air from the primary air supply, wherein the primary air module is configured to lower the pressure of the first and second amounts of the high pressure air in the primary air module to thereby form a first amount of the low pressure breathing air in the primary air module, and the primary air module is configured to supply the first amount of the low pressure breathing air from the primary air module to the one or more sealing and locking helmets and/or one or more air respirators;

a one valve back-up circuit in a back-up air module, the one valve back-up circuit configured to receive a third amount of the high pressure air from the secondary air supply, wherein the third amount of the high pressure air bypasses the primary air module, and the back-up air module is configured to lower the pressure of the third amount of the high pressure air to thereby form a second amount of the low pressure breathing air; and a reserve bottle isolated from depletion by a one-way check valve and configured to supply a fourth amount of the high pressure air to the one valve back-up circuit in the back-up air module upon unavailability of the secondary air supply for the one valve back-up circuit, and the back-up air module is configured to lower the pressure of the fourth amount of the high pressure air to thereby form a third amount of the low pressure breathing air.

9. The system of claim 8, wherein the primary and secondary air supplies are external to a cube in which the reserve bottle is located, and the system is configured to automatically fill the reserve bottle by pressure equalization when the secondary air supply connects to the cube.

10. The system of claim 9, wherein the one-way check valve is configured to automatically maintain the filled pressure of the reserve bottle as the secondary air supply is spent.

11. The system of claim 8, wherein the back-up module further comprises a primary back-up circuit in addition to the one valve back-up circuit, and optionally the back-up module further comprises a secondary back-up circuit in addition to the one valve back-up circuit and the primary back-up circuit.

12. The system of claim 8, wherein the one valve back-up circuit comprises a single high flow ball valve.

13. The system of claim 8, wherein the one valve back-up circuit comprises at least two parallel high pressure regulators, and both of the at least two regulators are set to a pressure of at least about 10% lower than a system operating pressure.

14. The system of claim 8, further comprising a third air supply configured to provide a fifth amount of the high pressure air from to the primary air module and then to one or more air respirators.

* * * * *